Oct. 14, 1952  P. C. MATHIEU  2,613,572
APPARATUS FOR SPECTROPHOTOMETRY
Filed July 10, 1951  3 Sheets-Sheet 1
*Fig. 1*
*Fig. 14*
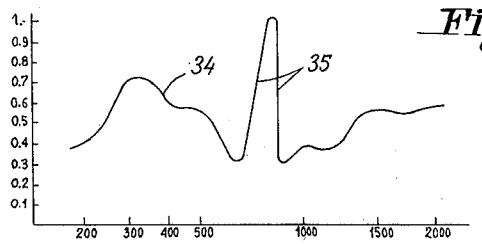
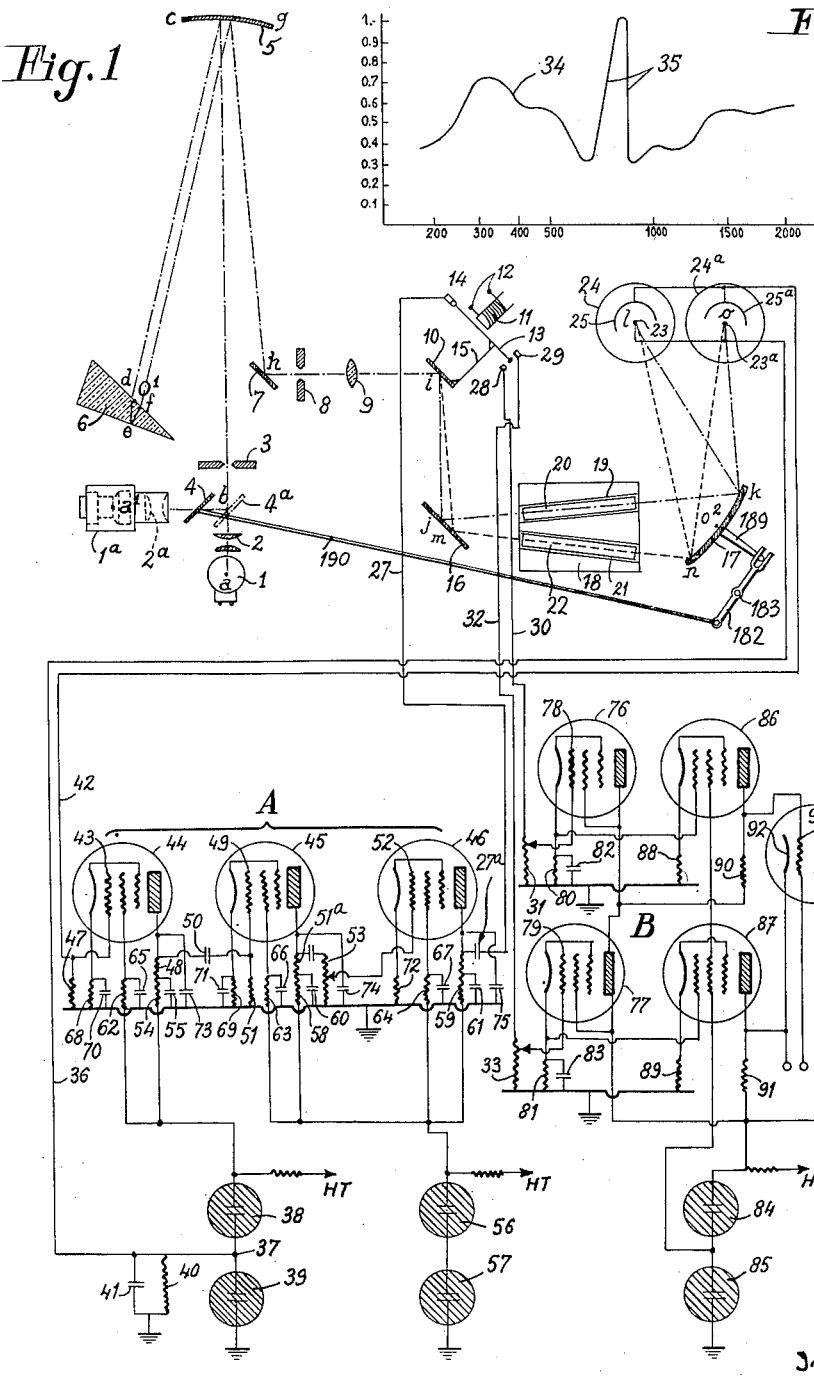
Inventor:
PAUL C. MATHIEU
by: J. Delattre-Seguy
Attorney Oct. 14, 1952     P. C. MATHIEU     2,613,572
APPARATUS FOR SPECTROPHOTOMETRY
Filed July 10, 1951     3 Sheets-Sheet 2

Inventor:
PAUL C. MATHIEU
by: J. Delattre-Seguy
Attorney

Oct. 14, 1952 P. C. MATHIEU 2,613,572
APPARATUS FOR SPECTROPHOTOMETRY
Filed July 10, 1951 3 Sheets-Sheet 3
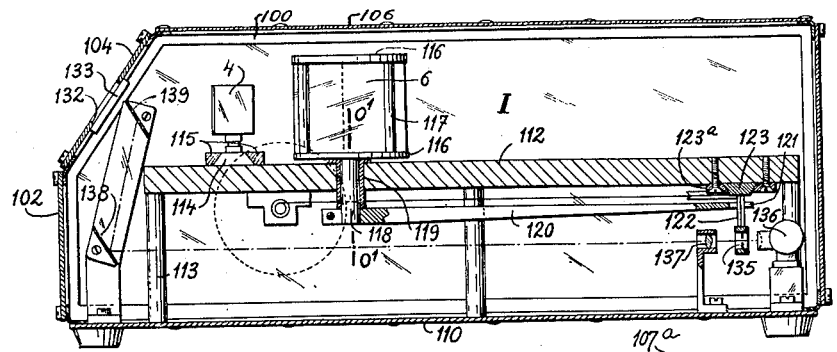
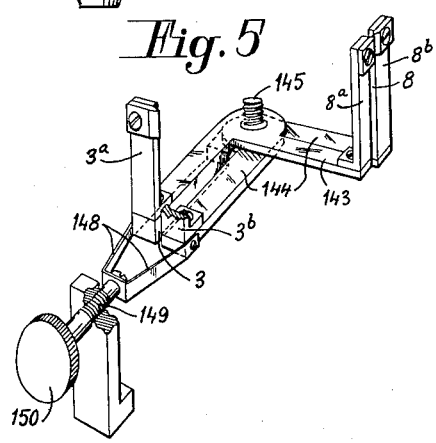
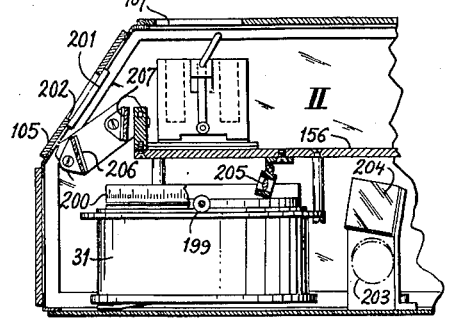
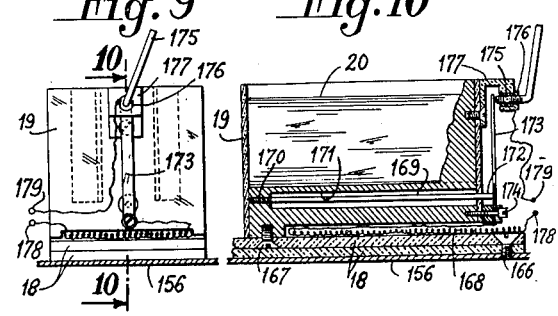
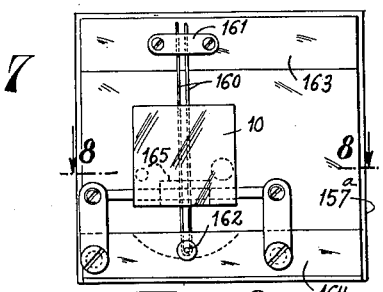
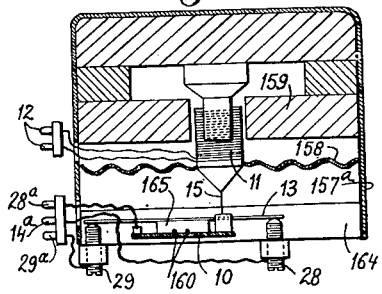
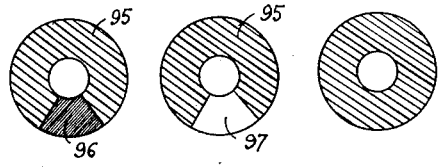
Inventor:
PAUL C. MATHIEU
by: J. Delattre-Seguy
Attorney Patented Oct. 14, 1952

2,613,572

UNITED STATES PATENT OFFICE 2,613,572

APPARATUS FOR SPECTROPHOTOMETRY

Paul Charles Mathieu, Epinay-sur-Orge, France, assignor to Etablissements Jouan, Paris, France, a French body corporate Application July 10, 1951, Serial No. 235,977
In France July 24, 1950

5 Claims. (Cl. 88—14)

This invention relates to improvements in method and apparatus for use in spectrophotometry.

The importance assumed by colorimetric analysis in chemical industries as well as in biology has required the design and production of increasingly improved spectrophotometers.

The instruments so far and now in use are all based upon a well known principle of spectrophotometry, which consists in measuring the weakening or absorption of a luminous pencil as it traverses either a solution of the material under study in a suitable solvent or said material by itself, if it is liquid and sufficiently transparent. This absorption is generally translated numerically in terms of optical density, the latter being the logarithm of the ratio between the intensity of the luminous flux at the inlet and at the outlet of the recipient containing the solution or the material under study. Under these conditions, the density zero corresponds to a truly transparent material, while the density 1 corresponds to a material the transparency of which is one-tenth that of the former material, and so forth.

With this known process, whether the measurement is that of the relative weakening by a solution in comparison with a standard solution, or that of the absolute absorption, related to vacuum or in practice to the air, it is necessary, for a light having a given wave length, to make two measurements: in one of these, the luminous beam or flux is caused to pass through the solution of the material under study; in the other a luminous beam or flux of identical wave length is caused to pass through the standard solution or through air.

The demand is presently increasing for instruments and methods permitting to carry out the determinations involved in as monochromatic a light as possible, and cumulatively or alternatively, on an increasingly broad spectral scale, going from the ultra-violet range to the infra-red range, both inclusive, and with the utmost precision.

The spectrophotometric measurements most usually made belong to three categories:

(a) Measurement of the absorption of a series of samples with a given wave length;

(b) Measurement of the variation in the absorption of a given sample in function of the wave length;

(c) Determination of the variation in the absorption of a given sample, for a given wave length, in function of the time element.

If accurate measurements are desired, the instruments and methods so far known require a new calibration for each of the measurements, because in cases (a) and (b) above the previous calibration of the zero point may have changed during the measurement, and in case (b) the calibration depends upon the wave length as a function of the variations in the response of the instrument, dependent upon the wave length of the light used.

If none of the characteristic points of a curve are to be missed, which requires the tracing of a curve with a great number of points, the measurements effected with the known methods and apparatus are very tedious.

The invention relates to improvements in the known processes of spectrophotometry, such improvements being such as to permit:

On the one hand, fast accurate readings, free from any recurrent errors, presenting at the most an error of no practical significance, amounting to about $\frac{1}{10,000}$, and corresponding to the material accuracy of the reading;

And on the other hand, to detect as many points as desired and needed to trace quickly an accurate spectrophotometric curve, giving as ordinates the optical densities in function of the wave lengths, which are plotted as abscissa.

The improved process and apparatus of this invention exhibit the following important features:

Forming a single luminous beam, causing this beam to travel alternatively along two routes; one of these routes is for calibration and standardization, while the other is for measurements and traverses the material or the solution thereof under study; promoting with said beam, irrespective of the route, a photoelectric transformation, the transformation ratio remaining constant for at least two consecutive travels so that the ratio of the voltages created in and relating to said routes respectively is permanently strictly proportional to the intensity of the luminous beam as it leaves said two routes; amplifying said voltages and comparing said amplified voltages, relative to said two routes, and selecting a frequency between the alternate travels of the luminous beam sufficiently great to insure, on the one hand, the comparison aforesaid which may be effected on any adequate number of alternances, and on the other hand, that the single luminous beam and the conditions of the photoelectric transformation are not modified as a result of possible variations of outside factors influencing this beam and said transformation.

On the one hand, it is useful to adopt for the change of route as high a frequency as possible, in order to be certain that the operating conditions do not change during a set of two consecutive routes. On the other hand, said frequency must be lower than the limit of frequency allowing the photoelectric transformation. For instance, a frequency of fifty cycles per second can be adopted, which corresponds to that of the alternating current of public utility distributing stations; this permits using such a current to secure automatically the changes of route of the luminous beam, and, simultaneously, to secure the feed voltages required for the photoelectric transformation, because the voltage variations of such a current over a cycle are negligible.

The invention relates also to a spectrophotometer adapted to use the improved process aforesaid. This device comprises the following important features: at least one luminous source, an optical device which produces from said source a luminous beam, a principal oscillating mirror by means of which said beam is caused to follow one or the other of two routes, means for controlling the oscillations of said mirror, supporting means on one of said routes to hold a receptacle adapted to receive the diluted or undiluted material to be tested, supporting means on the other of said routes to hold, if necessary, a receptacle adapted to receive a solution of a standard material, an optical device located beyond said supporting means and adapted to converge the two routes, at least one photoelectric cell located at the point of convergence of said two routes, and so disposed that its anode receives the luminous beam irrespective of the route followed by the beam, electronic means to amplify, at all times, the voltage created in said cell by said beam, and a measuring device to compare the amplified voltages relating respectively to each of said two routes.

When the wave lengths over which measurements of optical density are desired cover a wide range, for instance from infra-red to ultra-violet, a single luminous source and a single photoelectric cell cannot cover this entire range; in that case there are provided two luminous sources having overlapping spectral zones, two photoelectric cells having respectively a spectral zone corresponding to that of one of said luminous sources, as well as selecting and connecting means permitting of actuating automatically with either one of said luminous sources the cell which is paired therewith.

As further important features of this invention, as a result of the use of one photoelectric cell for the two luminous routes, the determination is no longer subjected, as was the case with the devices so far in use which comprise two different cells, to the possible variations of the spectroscopic characteristics between cells, variations which do exist between two such cells, even when all other conditions remain the same.

Moreover, as a result of the very rapid alternation between the measurement and the calibration or inversely, namely, the switch from one to the other of the beam's routes, the comparison between the intensities of the luminous beam after two successive travels is no longer falsified by systematic errors, because:

On the one hand, the initial intensity of the luminous source does not have the opportunity to vary, during such a short time, as a result of variations in one of the factors influencing said intensity, particularly in the power (electrical current, gas, etc.) from which the luminous source is produced; and On the other hand, for the same reasons, the operating conditions of the photoelectric cell and of the measuring device have no opportunity to vary (by heating for instance); this is the condition which has been expressed above by the statement that the ratio of the photoelectric transformation is constant at least for two successive travels of the luminous beam over the different routes.

A comparison of the voltages on the basis of a single change of route would apparently be too short to permit a reading; but a reading is made possible by the time constant of the control device, the comparison bearing upon a sufficient number of alternances of route. During a determination, which may last from a few seconds to a few minutes, dependent upon the skill of the operator, external factors may vary, but this is unimportant, since the unitary comparisons relating to any two successive travels remain accurate.

The foregoing and other features of this invention will appear from the following description, as well as from the attached drawing, all of which should be considered merely as illustrative, without limitation.

In the drawing:

Figure 1 is a diagram of the optico-electrical assembly of a spectrophotometer according to an embodiment of the invention;

Figure 4 is a cross-section according to line 4—4 of Figure 3;

Figure 5 is a perspective representation of the means for controlling the width of the slots of the optical portion of the device;

Figure 6 is a partial cross-sectional view along line 6—6 of Figure 3;

Figure 7 is a front view of the oscillating mirror and of its control mechanism;

Figure 8 is a cross-sectional view along line 8—8 of Figure 7;

Figure 9 is an end view of a detachable tank for holding the material to be tested, and of its support;

Figure 10 is a longitudinal cross-section along line 10—10 of Figure 9;

Figures 11, 12, 13 are diagrammatic representations of the electronic tube or magic eye which permits the control of the invention before a reading of the results is taken;

Figure 14 is an illustrative, small scale representation of the type of absorption curve which can be plotted by using the invention, with great accuracy and in one or two minutes.

Figures 2, 3:
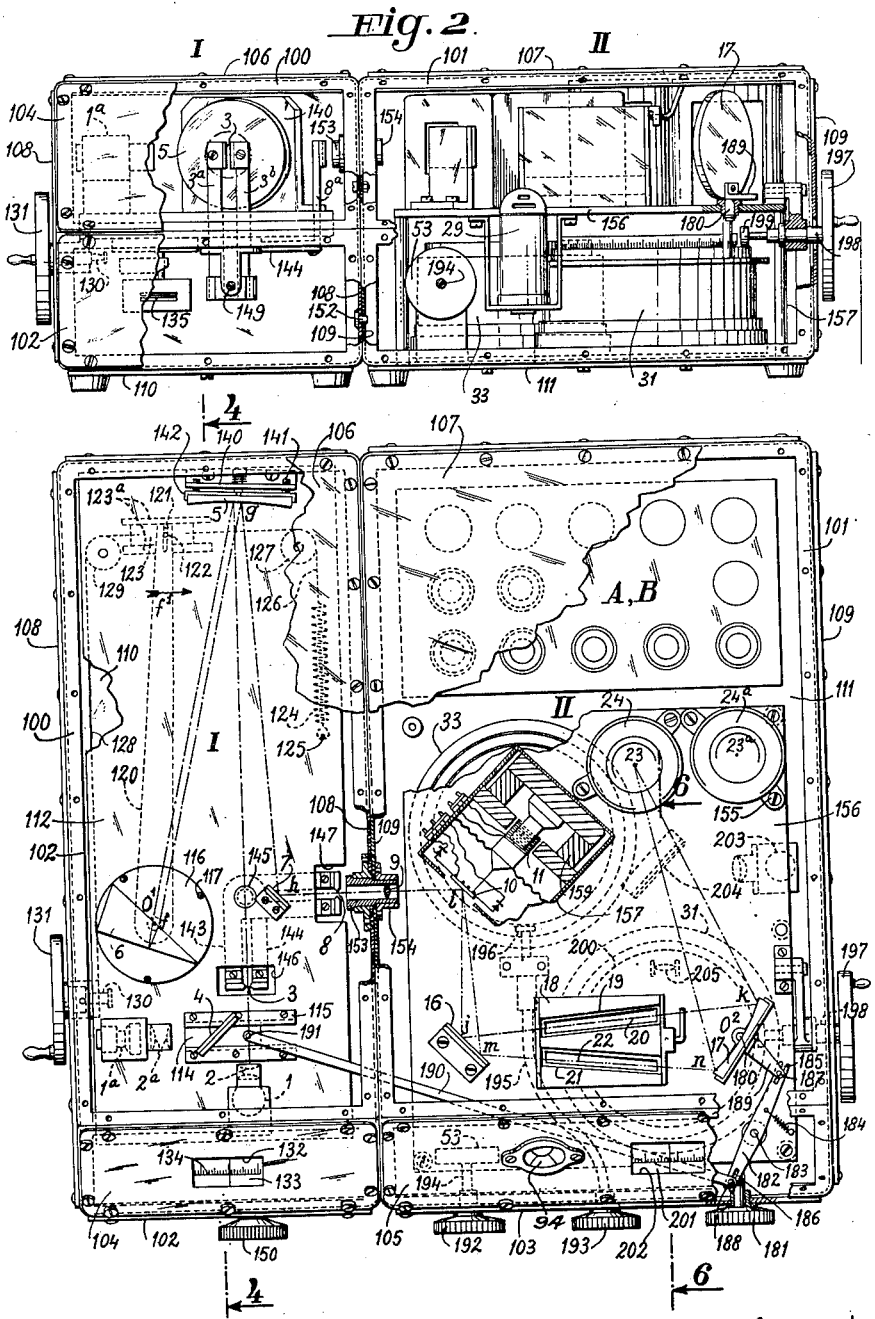
Figure 2 is a front elevation, with certain parts cut out, of a device according to the invention.
Figure 3 is a plan view corresponding to Figure 2.

The invention will be described first by reference to the optico-electrical diagram of the spectrophotometer and its operation, according to the assembly shown in Figure 1, and the illustrative embodiment shown in Figures 2 to 10.

By reference to Figures 1 to 3, the device object of the invention comprises two luminous sources 1 and 1a; source 1 is adapted to produce a luminous beam which comprises the infra-red range, and source 1a a luminous beam which comprises the ultra-violet range, while the spectral range of these two sources overlap each other; these sources are associated with condensers 2 and 2a and their light is analyzed either by means of filters or, as shown and hereafter described, by means of a monochromatic filtering device. The monochromatic filtering device comprises a first adjustable optical slot 3 through which passes the luminous beam along axial line $bc$, the beam originating either directly with source 1 along line $ab$, or with source $1a$ along line $a_1b$ by means of a movable mirror 4; the latter when brought to the position $4a$ permits using source $1a$ covering the infra-red range, while at position 4, it masks said source.

At $c$, the beam having for axis the line $bc$ is reflected by a spherical mirror 5 onto a quartz prism 6, the rear face of which is silvered; said prism is mounted rotatively on axis $0_1$. The beam, which in the following, for the sake of simplification, and because it is narrow, will be identified by mere reference to its axis, reaches prism 6 at $d$, is there refracted, is then reflected by the silvered rear face of prism 6, is refracted a second time at $f$ and is redirected along axis $fg$ onto mirror 5. From point $g$ on said mirror the beam is directed along axis $gh$ onto a plane mirror 7 so disposed as to deflect axis $gh$ angularly along line $hi$ towards a second adjustable slot 8, then through an objective lens 9 after which, at $i$, the beam reaches an oscillating mirror 10.

Mirror 10 oscillates, for instance, with a frequency of fifty cycles per second, under the impulse of an alternating electric current acting, through a winding 11 connected at 12 with the power line, on a blade 13 which oscillates around pivot 14 and to which mirror 10 is rigidly connected by an attachment 15.

Mirror 10 reflects the luminous beam along one or the other of two routes, $ij$ or $im$, depending upon the mirror's position, towards and onto a stationary mirror 16. The latter in turn reflects the beam on either of said two routes onto a large spherical mirror 17 along lines $jk$ or $mn$; mirror 17 is mounted for oscillation around an axis $0_2$ and is movably connected with retractable mirror 4 by arm 189, a forked lever 182 pivoting around fixed pivot 183, and a connecting rod 190 between lever 182 and mirror 4; as a result of this arrangement (see Figs. 1 and 3), the orientation of mirror 17 is bound with the position of movable mirror 4; and, dependent upon said orientation, mirror 17 causes a reconvergence onto a single point, either $l$ or $o$, of two different routes of the beam. These two different routes are shown, the one at $ijk$ and $l$ or $o$; the other at $imn$ and $l$ or $o$ (Fig. 1).

A container 19, having transparent walls, is located on a support 18 on the first route or path, between $j$ and $k$, and contains a solution 20 of the material, the light absorption curve of which is to be determined.

A similar container 21 may be disposed on support 18 on the second route, between $m$ and $n$, and contains a solution of a standard substance 22, when the determination involved is that of the relative absorption curve of the material under study with respect to the absorption by said standard substance. On the other hand, if the curve to be determined is that of absolute absorptions, namely, absorptions relative to vacuum or, in practice, to air, the container 21 is removed and the portion $mn$ of the route corresponds to a free path through the air.

The anode 23 of a photo-electric cell 24 is located at point $l$, and the spectral zone of this cell is sensitive to and including the infra-red.

The anode $23a$ of a second photo-electric cell $24a$ is located at point $o$; the spectral zone of this second cell is sensitive to and including the ultraviolet, and overlaps the spectral zone of the cell 24. Cells 24 and $24a$ are provided with cathodes 25 and $25a$, respectively, and are connected in parallel to an electronic amplifier A having linear characteristics, the purpose of which is to amplify the alternative tensions given by one or the other of said cells, upon impact thereon of the luminous fluxes which have traveled along the measurement route $ijk$ ($l$ or $o$) or along the standard route $imn$ ($l$ or $o$).

The outlet of amplifying stage A is connected by condenser $27a$ and conductor 27 to the blade 13 which operates cooperatively with oscillating mirror 10 and which constitutes the moving part of an electric reverser and thereby insures, depending upon the position of mirror 10, the electrical connection of conductor 27 with either contact 28 or 29.

Contact 28, on which blade 13 rests when in the illustrated installation of Fig. 1, mirror 10 occupies a position corresponding to the measuring path $ijk$ ($l$ or $o$), is connected by conductor 30 to a measuring potentiometer 31; contact 29, on which blade 13 rests when mirror 10 occupies the position corresponding to the standardization or calibration path $imn$ ($l$ or $o$) is connected by conductor 32 to a potentiometer 33 for standardization or calibration.

As a result, the amplified alternative tensions produced by cells 24 and $24a$ and amplifying stage A are synchronously applied to one or the other of said potentiometers according to the route traveled by the luminous beam, either along the measuring path or the calibration path. These potentiometers 31 and 33 are combined with a measuring device by means of which the tensions applied thereto can be compared, for instance, either by a zero method, or by means of a sensitive galvanometer, or again, as illustrated, by means of an electronic device B described hereafter and which comprises a detecting stage having infinite impedance, so that there is no consumption of energy on the potentiometers, an amplifying stage and an indicating device.

From the foregoing, the operation of the process of the invention will be understood as follows:

Luminous sources 1 or $1a$ give a single luminous beam, from which the monochromatic filtering device produces a monochromatic light, the wave length of which can be varied by rotation of prism 6 around axis $0_1$. Thus, by means of such rotation and of the selection of either source 1 or $1a$, it is possible to utilize any radiation comprised between ultra-violet and infra-red, both inclusive. The adjustable slots 3 and 8 produce a narrow beam of said radiation, which mirror 10, oscillating on the frequency of the current which feeds relay 11, directs alternately with said frequency along path $jk$ or $mn$. The beam is more or less absorbed along $jk$ as a result of its travel through the substance under study, and along $mn$ eventually as it passes through the standard solution. Finally, whichever its path, the beam is reflected by mirror 17 on either of cells 24 or $24a$, which transform the fluxes into alternative tensions. Two consecutive tensions are rigorously proportional to the flux to be measured and to the standard flux, since the alternance is fast ($\frac{1}{50}$ of a second, for instance) and the operating conditions of cells 24 or $24a$ have not changed in the meantime, nor the conditions of emission of the light from source 1 or $1a$.

Under these conditions, after the linear amplification given by stage A, the tensions can be compared easily by means of the two potentiometers and, for instance, of the associated control and zero indicating device B.

If a zero method is utilized as aforesaid, the potentiometer 33 used for control, standardization or calibration is first calibrated, after the potentiometer 31 has been set on zero, in order to obtain the zero calibration of device B in the absence of container 19, taking into account the intensity given at the time under consideration by source 1 or 1a, the feeding tensions of cells 24 or 24a and of amplifier A, etc. When container 19, with the solution it contains, is then put in place, it is sufficient to move the movable part of measuring potentiometer 31 until the zero setting is again obtained, as indicated by device, 27, 28, 29, in order that the position of the movable part of said potentiometer 31 give the solution's optical density; the latter can be given directly, for instance, if said potentiometer bears a logarithmic scale graduated in optical densities.

To each angular position of prism 6 corresponds a reading. In practice, the reading is effected over about ten cycles, or in about one-fifth of a second, which gives a most accurate average value. Thus, over an interval of one or two minutes, it is possible to plot a considerable number of points and to draw a curve similar to that of Fig. 14, which shows at 34 the curve of the optical densities D drawn as ordinates, in function of the wave lengths in millimicrons plotted as abscissae on a logarithmic scale, for instance.

Since it is possible to plot a very large number of points, it is possible to obtain a very accurate curve; and a very acute deflection, such as shown at 35 on the curve of Fig. 14, cannot remain undetected as could happen between two wide-apart measurements made with the devices and methods now in use. The latter, in order to obtain the same accuracy which is secured within a few minutes with the invention, would require several working days, and in practice, require therefore that the plotted points be too far apart.

The causes for the great accuracy obtained, at least $1/10,000$, have been set forth heretofore. Said accuracy is, of course, function of the accuracy of potentiometers 31 and 33, and of the readings thereon and on the means of control of prism 6.

The invention will be next described with reference to the electrical circuit illustrated in Fig. 1; in the following description it will be understood that numerical quantities are given as examples, and may be correspondingly varied.

The two cells 24 and 24a are of the known type A23. They are permanently connected in parallel; their anodes 23 and 23a are fed from the high tension HT by a conductor 36 connected at 37 midway between two regulators 38 and 39, type REG 110, mounted in series between the high tension and the ground. These anodes are uncoupled by a resistance 40 of 10,000 ohms and a condenser in parallel 41 of 8 microfarads.

The cathodes 25 and 25a of these two cells are connected in parallel, by a conductor 42, directly to the control grid 43 of the first lamp 44 of amplifying stage A which comprises 3 lamps 44, 45 and 46, type 6AG5 for instance.

The grid-leak of lamp 44 is insured by means of a resistance 47 of one megohm.

The anodic current of lamp 44 passes through a charge-resistance 48 of 1000 ohms and the tension is transmitted to grid 49 of the second lamp 45 through a condenser 50 of 50,000 centimeters (one centimeter of capacity being equal to one nine-hundredths millimicrofarad) and a leak-resistance 51 of 1 megohm. Similarly, the anodic current of lamp 45 passes through a charge-resistance 51a of 10,000 ohms and the tension is transmitted to grid 52 of the third lamp 46 through a potentiometer 53.

The anodic tensions are taken: for lamp 44, at the HT terminal of regulator 38 through a resistance 54 of 10,000 ohms shunted by means of a condenser 55 of eight microfarads; for lamps 45 and 46 on the positive terminal of another regulator 56, mounted in series with another regulator 57, and through uncouplings provided by resistances 58 and 59 of 10,000 ohms, shunted by condensers 60 and 61 of eight microfarads.

The screen-grids of the three lamps 44, 45 and 46 are connected with the HT through resistances 62, 63 and 64 of 70,000 ohms, shunted respectively by condensers 65, 66 and 67 of eight microfarads.

Stage A insures of a linear amplification, obtained for the first two lamps 44 and 45 by causing them to operate within the strictly linear portions of their characteristics, as a result of the use of very weak charge-resistances and of the limitation to a very small value of the input-amplitude; it will be noted that the input tension of the first lamp 44, caused by the lighted cell, is very weak. The cathodic polarization of the first two lamps 44 and 45 is insured respectively by resistance 68 or 69 of 100 ohms, shunted by condenser 70 or 71 of 100 microfarads.

As to the third lamp 46, the input amplitude is quite high, and it is necessary to have recourse to quite high a counter-reaction. The latter is obtained by the elimination of the cathodic uncoupling condenser; the polarization of the cathode is then obtained by means of a resistance 72 of 100 ohms which gives a rate of counter-reaction of about 20%.

In order to eliminate all the possible high-frequency inductions which could reach the amplifier in spite of the screenings used, the plates of the three lamps 44 to 46 are shunted respectively by condensers 73, 74 and 75 of 5000 cms.

The electronic device B for zero-control is combined with potentiometers 31 and 33. It comprises a symmetrical detecting stage utilizing two lamps 76 and 77, type 6AG5. These two lamps are mounted as detectors with infinite impedance in order that no charge be transmitted onto potentiometers 31 and 33 which are connected to their control grids 78 and 79.

The polarization of these lamps is secured by resistances 80 and 81 of 100,000 ohms, respectively, each uncoupled by a condenser 82 or 83 of eight microfarads. Their anodic tension and screen tension are taken on the HT terminals of two regulators 84 and 85 mounted in series.

The current detected by lamps 76 and 77 is amplified by two lamps 86 and 87, also type 6AG5, having control grids connected to the cathodes of the two detector lamps 76 and 77. This amplification is linear, as a result of the use of a very high rate of counter-reaction, about 60%, obtained by means of two non-uncoupled polarization resistances 88 and 89, of 1500 ohms.

The anodic current of these lamps 86 and 87 is taken on the HT through resistances 90 and 91 of 33,000 ohms.

The differential potential obtained on the plates of these lamps 86, 87, at the terminals of said resistances 90, 91, is applied between the cathode 92 and the grid 93 of a magic eye 94, type 6E5. This potential may be positive or negative, according to the respective positions of the sliding contacts of the two potentiometers 31 and 33.

If grid 93 is positive, screen 95 of the magic eye 94 shows a dark area 96 (see Fig. 11). On the contrary, if said grid is very negative said screen 95 shows a clear sector 97 (see Fig. 12). When the tension of said grid is nil, the screen is of uniform color (see Fig. 13). Then, the calibration to zero has been obtained. The passage from a dark area 96 to a clear one 97 is easily seen and corresponds, for the type of lamp specified, to a potential differential of plus or minus 0.25 volt.

But the two potentiometers 31 and 33 are large-size winding potentiometers, having, for instance, a diameter of 150 mm., and comporting a large number of windings, at least 4000, which allows an easy appreciation of a variation of potential, in the neighborhood of one-thousandth of the total potential applied thereto, which corresponds to 4 windings in the case of potentiometers having 4000 windings. The amplification of stage A is of the order of 100,000 which gives, with the cells given in the example, a total potential of the order of 15 volts on said potentiometers. Four windings correspond therefore to a variation of 0.015 volt; and since the amplification of the final stage is about 16, this variation of 0.015 volt corresponds on the grid of the magic eye to a variation of $0.015 \times 16$ or 0.25 volt, precisely the value required to pass from the showing of Fig. 11 to that of Fig. 12 or inversely. The sensitiveness of the wiring corresponds, therefore, to 4 windings in the potentiometers.

The apparatus is completed with the usual known feed box, not shown.

It will be noted that amplifier A allows a considerable amplification (100,000) as it is very stable, since the charge potentials are stabilized by the gas regulators (type REG 110) 38, 39, 56, 57, 84 and 85.

As to potentiometer 53, it permits the control of the amplification ratio. This control is necessary, on account of the very large differences between the values of the photoelectric tensions, according to the wave length of the light used.

A practical embodiment of the invention will now be described by reference to Figs. 2 to 10.

This embodiment comprises two interconnected parts: the first corresponds to luminous sources 1, 1a, to their dependent parts and to the monochromatic filtering device; the second corresponds to the spectrophotometer itself; while the latter can be more particularly used for a study of monochromatic luminous absorption over the entire spectrum from infra-red to ultra-violet, it can also be used to study the optical density of a substance in white light, or in any event in a light covering a given area of the spectrum, as produced by the luminous source either without any filtering device or through any known suitable filter.

The two sections of the apparatus are located, as shown in Figs. 2 and 3, within two cases I and II, having different widths, case II, containing the spectrophotometer proper, being the wider. These cases are shaped as rectangular parallelepipeds, but their front faces comprise an upper slanted portion which forms an observation board. These cases are formed by a rigid frame 100 or 101 supporting paneled faces such as the two front vertical panels 102 and 103, the two slanted panels 104 and 105, the upper panels 106 and 107, the side panels 108 and 109 and the bottom panels 110 and 111.

First describing case I and the parts which it contains, it comprises a horizontal bridge 112, attached to the bottom 110 by spacers 113 (Figs. 3, 4).

The two luminous sources 1, 1a are attached to bridge 112. The adjustable mirror 4 can be moved by means of a slide 114, guided between two transverse guides 115. Prism 6 is set inside a lantern formed by two discs 116 connected by rods 117 (Fig. 4); the lower disc is linked with a swivel 118 having an axis $01$—$01$, which is mounted loose in a sleeve 119 which traverses bridge 112. A lever 120 is pinned to the lower end of said swivel 118, said lever extending toward the rear of the case. The rear end of said lever forms a fork 121 in which a lug 122 is engaged. Said lug is carried by a sliding bar 123, directed by sliding guides 123a attached to the lower face of bridge 112. This sliding bar 123 operates as follows:

In the direction of arrow $f_1$ (Fig. 3), by a spring 124, attached to bridge 112 at 125 and connected with the sliding bar 123 by a cable 126 which passes over a pulley 127;

And in the direction inverse to that of arrow $f_1$, and in opposition to spring 124, by another cable 128 passing over a pulley 129 and winding around a small winch 130, the rotation of which is controlled by a lateral operating wheel 131.

Thus, the rotation of the wheel 131 in the suitable direction insures, through cable 128, slide 123 and lever 120, the rotation in the desired direction of lantern 116, and therefore of prism 6; this permits to cause, by means of said prism, the reflection along $f\,g$ onto mirror 5 of a substantially monochromatic beam of light, the wave length of which can, at will, assume any desired value from the infra-red to the ultra-violet ranges.

The wave length depends upon the position of prism 6; the rotation of this prism to sweep the whole of the corresponding spectrum amounts to an angle of about 7 grades. On account of the length of lever 120, this corresponds to a displacement of the end of said lever equal to about 40 mm. In order to locate this displacement with the utmost accuracy, without introducing the inherent play of mechanical demultiplication devices, one resorts to the optical projection, onto a window 132 provided in a front slanting panel 104 and having a ground glass 133, bearing a vertical check line, of a micrometer 135 carried by lug 122 which controls without play the lever 120. In this way, it is possible to observe on the glass the passage of the enlarged image 134 of the micrometric scale 135 image formed by a lens 137 and reflecting mirrors 138 and 139. A luminous source 136 lights micrometer 135. (Fig. 4.) The optical amplification is of the order of 25 times, which is equivalent to a reading of the wave lengths on a scale of one meter.

Mirror 5, which receives along $f\,g$ the monochromatic beam refracted by prism 6, is carried by a plate 140 (Figs. 2 and 3) attached to bridge 112 and is connected to the latter through intermediate adjustable screws 141 and mounting 142 of said mirror 5.

Case I also comprises a system of two adjustable slots 3 and 8 and their means of control. As shown in perspective in Fig. 5, said slots are made up of two sets of parallel blades 3a, 3b, and 8a, 8b. Blades 3a and 8a are attached to the two ends of a right-angle lever 143. Similarly, blades 3b and 8b are attached to another right-angle lever 144. Both of said levers are mounted free on a swivel which forms the smooth part of a screw 145, otherwise screwed from underneath into bridge 112. The two blades 3a and 3b defining slot 3 project above bridge 112 through an opening 146, while the two blades 8a and 8b forming slot 8 project through a lateral notch 147 of said bridge (Fig. 3).

Thus, right-angle levers 143 and 144 form two conjugated compasses, the opening or closing of which control those of slots 3 and 8. Such opening and closing are controlled by a resilient stirrup 148 (Fig. 5) which is in turn controlled for longitudinal displacements by an operating screw 149, engaged in front panel 102 of case I, and provided with an operating knob 150 (Figs. 3 to 5).

Case I is provided on its right longitudinal face 108 (Figs. 2 and 3) with lugs 152 (Fig. 2) the purpose of which is to permit centering said case I with respect of case II by penetration inside holes provided in the corresponding face 109 of said case II.

Moreover, at right angle to the portion $h\, i$ of the axis of the luminous beam, a mounting 153 is attached to said wall 108. This mounting projects outside and carries objective lens 9. When cases I and II are connected, mounting 153 fits within a centering sleeve 154, provided on side 109 of said case II (Figs. 2 and 3).

Case II corresponds to the spectrophotometer proper. It comprises at the rear the assembly of the electronic devices A and B shown in and described with respect to Fig. 1. In front, the two photoelectric cells 24 and 24a are disposed. They are attached by means of screws 155 to a bridge 156 attached in turn by spacers 157 to the bottom 111 of case II. This bridge also carries on its upper face a case 157a, containing the device by means of which the oscillations of mirror 10 and the operation of the blade 13 of the switch are obtained. Said device (Figs. 7, 8) comprises an electro-magnetic motor bearing winding 11, connected by terminals 12 to the power distribution mains. This winding is carried by a resilient membrane 158 and moves within the field of a powerful permanent annular magnet 159. It is connected by rod 15 to mirror 10, which is pivotally mounted, as it is connected to two elastic, parallel and adjacent strands of wire 160, which are attached at 161 and 162 to two cross bars 163 and 164 of case II and operate by torsion. Blade 13 of the switch is attached to mirror 10 by means of a prop 165 and abuts either on terminal 28 or 29, respectively connected by conductors 30 and 32 (Fig. 1) to potentiometers 31 or 33.

In the illustration of Figs. 7 and 8, the mirror and its electromagnetic control device form a whole, provided laterally with two connecting or feeder pins and with three pins 14a, 28a and 29a respectively connected to blade 13 and to terminals 28 and 29 (Fig. 1).

As already explained in connection with Fig. 1, mirror 10 reflects the luminous beam onto $j$ or $m$ on stationary mirror 16, fixedly attached to bridge 156 (Fig. 3), and said fixed mirror in turn reflects the beam along $jk$ or $mn$ towards spherical mirror 17; containers 19 and 21 for the substance under study and the standard substance are respectively disposed on routes $jk$ and $mn$ (Figs. 1 and 3).

Figs. 9 and 10 illustrate a construction of container 19 or 21. Such a container rests on bridge 156 through a support 18, which is a thermal insulator and comprises two plates, connected together and to bridge 156 by means of screws 166. The upper plate 18 is connected to the bottom of container 19 (or 21) by screws 167; said bottom contains an electrical heating unit 168 which allows to heat the substance under study to the desired temperature, which is controlled by means of a thermostat consisting, for instance, of a rod of Invar metal 169. Rod 169 is attached at one end at 170 to one side of the container's bottom and is freely located inside a hole 171 in said bottom, and at its other free end 172, said rod abuts a resilient blade 173, upon suitable adjustment. Resilient blade 173 is attached near one of its ends to the bottom of the container by screw 174, and its free end can rest on a screw 175 screwed in a nut 176 carried by a flange 177 attached to the container. The heating circuit, from terminals 178 and 179, is as follows: terminal 178, heating element 168, screw 174, blade 173, screw 175, nut 176 and terminal 179.

The thermostat operates as follows: When the temperature of the container increases, the container expands, while the Invar rod 169 does not; end 172 of the rod moves, therefore, inwardly relatively to the container and resilient blade 173, which abuts end 172 of the rod, follows said end; thus, for a given maximum temperature, the free end of blade 173 ceases resting on screw 175; at that time the current is cut off. By regulating screw 175, it is therefore possible to control the maximum temperature which can be reached by the substance 20 under study in container 19, or similarly by the standard solution in container 21.

Containers 19 and 21 are removable, and can be put in place or removed through an opening 107a provided in the upper face 107 of case II (Fig. 6).

As specified above, the purpose of mirror 17 is to reflect the luminous beams, after their passage through the containers, towards the anode 23 or 23a of the corresponding photoelectric cell 24 or 24a. Mirror 17 is mounted pivotally around an axis $O_2$ by means of a pivot 180 in bridge 156 (Figs. 2 and 3). As stated, the positions of mirror 17 must be synchronized with those of retractable mirror 4, in order that mirror 4 should reflect towards slot 3 either the light beam from source 1 when mirror 17 reflects towards anode 23 the luminous beams which have passed through the containers, or the light beam from source 1a when mirror 17 throws the luminous beams towards anode 23a. The synchronization of the motions of these two mirrors 4 and 17 is obtained by means of an operating knob 181 (Fig. 3) located on the front face of case II. This knob actuates through a radial finger a lever 182, pivotally mounted at 183 on bridge 156 against the tension of a spring 184 which tends to bring lever 182 back to the position in which mirror 17 reflects the luminous beams towards anode 23. At both of its ends, lever 182 is shaped into forks 185 and 186, which engage respectively pins 187 and 188; these pins are respectively carried by a lever 189 attached to the pivot 180 of mirror 17 and by one end of a driving rod 190, which passes from case II into case I through openings provided in adjacent walls 108 and 109, and is articulated at its other end at 191 on the slide 114 which carries mirror 4.

As a result of this arrangement, spring 184 automatically returns the mirrors in the position in which source 1 is used, which gives a light the spectrum of which extends to the ultra-violet, mirror 17 then directing the luminous beams towards anode 23 of cell 24, also sensitive to ultraviolet radiations. On the contrary, when it is desired to use light the spectrum of which extends to infra-red, the rotation of knob 181 against the tension of spring 184 brings mirror 4 to position 4a (Fig. 1) and, simultaneously, mirror 17 reflects the luminous beam which reaches it towards anode 23a of cell 24a, sensitive to infra-red.

The front panel 103 of case II carries two more operating knobs 192 and 193. Knob 192 is connected by shaft 194 to potentiometer 53. Knob 193 is connected by a flexible cable to a friction roller 196 which provides for the motion of the movable finger of the calibration potentiometer 33, located under bridge 156 on bottom 111, which carries also the measuring potentiometer 31.

The movable part of potentiometer 31 is controlled by a wheel 197, the shaft 198 of which rotates in the lateral outer wall 109 of case II. Shaft 198 carries a friction roller 199, which is to entrain in rotation the movable part of potentiometer 31. This movable part is provided with a transparent cylinder 200 (Fig. 6) which bears a scale, which may be logarithmic, and which corresponds to the optical densities to be determined. This scale is projected onto a screen 201, located behind a window 202 of panel 105 of case II. The means to project said scale onto said screen 201 comprise a luminous source 203 (Fig. 3) projecting a light beam onto a mirror 204, which reflects it through cylinder 200, then through an objective lens 205 which gives a real enlarged image of the scale of cylinder 200 on screen 201, by means of two reflecting mirrors 206 and 207 (Fig. 6). The enlargement is 5, which gives a reading scale of two meters.

The operation of the specific embodiment which has been described above in detail is indicated by the generic description of the invention first given in connection with Fig. 1. The operator first adjusts slots 3 and 8 by means of knob 150. He regulates also the sensitivity of the electronic assembly A and B through potentiometer 53 by means of knob 192. He carries on with the preliminary standardization or calibration, with potentiometer 31 at zero, by the operation of potentiometer 33 by means of knob 193, until, for a given calibrating or standard solution, or in the absence of such a solution in the case of an absolute density, the control device, namely the magic eye 94, gives on its screen the uniform area of Fig. 13. At that time the apparatus is set at zero. Container 19, containing the substance to be studied, is then set in place and a series of readings is effected, each reading corresponding to a given wave length of the light used. Such wave lengths are obtained by the operation of wheel 131 and are read by means of the enlarged image 134 of micrometer 135 formed on screen 133 (Figs. 3 and 4). For each of the wave lengths selected by the operation of wheel 197, the operator brings the control device back to zero (Fig. 13) by manipulation of the measuring potentiometer 31; the reading made on screen 201, when the control device has been returned to zero, gives directly the value of the optical density.

It will be understood that the invention is not limited to the specific embodiments heretofore described, which are merely illustrative. For instance, the electronic assemblies A and B of Fig. 1 can be different from those described, particularly as regards the types of lamps set forth and the numerical values given to the various resistances and condensers. Even for the types of lamps set forth, the numerical values given are merely indicative, and can be modified according to the desired amplifications and the available electric tensions. Moreover, the detailed embodiment shown and described in connection with Figs. 2 to 10 is but a particularly practical embodiment, and can be modified without departing from the scope of the invention.

A grade in the angular scale given in the foregoing specification is the 400th part of a circumference.

I claim as my invention:

1. A spectrophotometric device, which comprises: two luminous sources adapted to emit light of overlapping spectral ranges, said ranges extending respectively to the infra-red and to the ultra-violet range; an optical device adapted to receive light from said sources and to produce from said light a luminous beam; primary oscillating reflecting means adapted to receive said beam and to reflect it alternately along two separate paths; optical reflecting means adapted to receive said beam along both said paths and to reflect same convergingly onto at least one single point; storage means disposed on at least one of said paths between said primary oscillating reflecting means and said optical reflecting means, and adapted to hold a subtance to be tested; two photoelectric cells, each having a spectral range corresponding to the spectral range of one of said luminous sources; each cell having its anode at one of said single points; electronic amplifying means adapted to amplify the electric tensions created in said cells by said beams; tension measuring means adapted to permit a comparison of said amplified tensions; and automatic selectivity means cooperating with, and disposed between, said luminous sources and said cells, and adapted to cause selectively the beam from one of said sources to reach the cell of corresponding spectral range.

2. A device as claimed in claim 1, in which: said two luminous sources are adapted to emit light along two converging directions to a common point; said selectivity means comprise: a movable plane mirror adapted to occupy two positions, the first position being between a first one of said sources and said common point, whereby said plane mirror prevents the light from said first source from reaching said primary oscillating mirror, but allows the light from the second of said sources to form said luminous beam, and the second position being at said common point, whereby said plane mirror prevents the light from said second source from reaching said primary oscillating mirror and reflects the light from said first source only to form said beam; and in which said optical reflecting means comprise an oscillating spherical mirror adapted to occupy two positions, each of which corresponds to a position of said plane mirror; said device further comprising a mirror displacement mechanism synchronized between and connected with said plane mirror and said oscillating spherical mirror.

3. A spectrophotometric device which comprises: at least one source of light; an optical device adapted to receive light from said source and to produce from said light a luminous beam; a primary oscillating mirror adapted to receive said beam and to reflect it along two separate alternate paths; optical reflecting means adapted to receive said luminous beam along said two paths and to reflect said beam along said two paths convergingly onto a single point; a container on at least one of said paths between said primary oscillating mirror and said optical reflecting means; at least one photoelectric cell having its anode at said single point and adapted to receive said converging reflection of said beam; a multi-lamp electronic amplifying stage adapted to amplify linearly at all times the tension created in said cell by said beam, a polarizing non-shunted resistance connected with the last lamp of said multi-lamp stage, whereby a high counter-reaction rate provides for said linear amplification; a potentiometer connected with said amplifying stage; and tension measuring means adapted to permit a comparison of the amplified tensions relating respectively to each of said paths.

4. A device as claimed in claim 3, in which said alternate paths comprise a measuring path and a calibration path, and in which said tension measuring means comprise a measuring potentiometer and a calibration potentiometer, a reversing switch synchronized with said primary oscillating mirror and cooperating with said potentiometers, whereby the amplified tensions from said cell reach said measuring potentiometer when said beam travels along said measuring path and said calibration potentiometer when said beam travels along said calibration path.

5. A device as claimed in claim 4, further comprising: two symmetrically disposed detecting electronic tubes, having infinite impedance; connections between the grid of each said tube and said calibration and measuring potentiometers; two linear amplification lamps; connections between the cathodes of said detecting tubes and the control grid of said lamps; a magic eye electronic tube having variable colored areas; and connections between the plates of said linear amplification lamps and the grid and cathode of said last named electronic tube respectively.

PAUL CHARLES MATHIEU.

REFERENCES CITED

The following references are of record in the file of this patent:

UNITED STATES PATENTS

| Number | Name | Date |
|---|---|---|
| 1,746,525 | Darrah | Feb. 11, 1930 |
| 2,342,771 | Voigt | Feb. 29, 1944 |
| 2,408,512 | Gradisar | Oct. 1, 1946 |
| 2,411,741 | Michaelson | Nov. 26, 1946 |
| 2,427,996 | Seaman | Sept. 23, 1947 |
| 2,499,322 | Mather et al. | Feb. 28, 1950 |